United States Patent
Wu et al.

(10) Patent No.: US 10,186,181 B2
(45) Date of Patent: Jan. 22, 2019

(54) DISPLAY DEVICE, METHOD AND APPARATUS FOR ADJUSTING BRIGHTNESS OF THE DISPLAY DEVICE, AND METHOD AND APPARATUS FOR TESTING THE DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hao Wu, Beijing (CN); Na An, Beijing (CN); Xuzhong Liu, Beijing (CN); Zongwei Luo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 131 days.

(21) Appl. No.: 15/289,178

(22) Filed: Oct. 9, 2016

(65) Prior Publication Data
US 2017/0278468 A1    Sep. 28, 2017

(30) Foreign Application Priority Data
Mar. 24, 2016  (CN) .......................... 2016 1 0172832

(51) Int. Cl.
*G09G 3/00* (2006.01)
*G09G 3/36* (2006.01)
(Continued)

(52) U.S. Cl.
CPC ............. *G09G 3/006* (2013.01); *G01B 7/22* (2013.01); *G02F 1/1309* (2013.01);
(Continued)

(58) Field of Classification Search
CPC .............. G09G 3/006; G09G 3/3607; G09G 2320/0693; G09G 2320/0233;
(Continued)

(56) References Cited

U.S. PATENT DOCUMENTS 5,994,916 A * 11/1999 Hayashi ................ G02F 1/1309
324/500
7,411,410 B2 * 8/2008 Kang .................... G02F 1/1309
324/756.07
(Continued)

FOREIGN PATENT DOCUMENTS

| CN | 102231016 A | 11/2011 |
| CN | 104729833 A | 6/2015 |
| CN | 105103541 A | 11/2015 |

OTHER PUBLICATIONS

First Office Action for Chinese Application No. 201610172832.0, dated May 3, 2018, 5 Pages.

*Primary Examiner* — Darlene M Ritchie
(74) *Attorney, Agent, or Firm* — Brooks Kushman P.C.

(57) ABSTRACT

A method for adjusting brightness includes detecting whether damage occurs on a light guide plate of the display device, determining a damage position and a damage extent of the light guide plate when the damage occurs on the light guide plate, and compensating for a change value of brightness generated due to the damage by adjusting the brightness of the display device corresponding to the damage position, according to a predetermined correspondence between damage extents and change values of brightness. The method for testing a display device includes applying a destructive operation to the display device to be tested, detecting a damage extent generated by the destructive operation and a change value of brightness correspondingly generated in a (Continued)

damage region, and creating and storing a correspondence between the damage extent and the change value of brightness.

16 Claims, 4 Drawing Sheets

(51) Int. Cl.
  *G01B 7/16* (2006.01)
  *G02F 1/13* (2006.01)
  *F21V 8/00* (2006.01)
(52) U.S. Cl.
  CPC .......... *G02B 6/0011* (2013.01); *G09G 3/3607* (2013.01); *G09G 2320/0233* (2013.01); *G09G 2320/0626* (2013.01); *G09G 2320/0693* (2013.01); *G09G 2330/12* (2013.01)
(58) Field of Classification Search
  CPC ....... G09G 2320/0626; G09G 2330/12; G02B 6/3586; G02B 6/3596; G02B 6/3574; G02B 6/0011; G01B 7/16; G01B 7/22; G02F 1/1309
  See application file for complete search history.

(56) References Cited

U.S. PATENT DOCUMENTS

| | | | |
|---|---|---|---|
| 2004/0095402 A1* | 5/2004 | Nakano | G06F 3/0412 346/102 |
| 2006/0109391 A1* | 5/2006 | Huitema | G09G 3/3611 349/19 |
| 2006/0280356 A1* | 12/2006 | Yamagishi | G09G 3/006 382/141 |
| 2007/0216670 A1* | 9/2007 | Yatsu | G09G 3/006 345/205 |
| 2008/0068404 A1* | 3/2008 | Ishii | G09G 3/20 345/690 |
| 2010/0134526 A1* | 6/2010 | Nanbu | G09G 3/2092 345/690 |
| 2010/0244705 A1* | 9/2010 | Hajjar | G09G 3/006 315/129 |
| 2011/0068816 A1* | 3/2011 | Kwon | G02F 1/1309 324/756.01 |
| 2013/0342558 A1* | 12/2013 | Sasaki | G09G 3/006 345/589 |
| 2014/0146070 A1* | 5/2014 | Liu | G09G 5/003 345/589 |
| 2014/0210841 A1 | 7/2014 | Song et al. | |
| 2014/0232880 A1* | 8/2014 | Murase | H04N 17/02 348/189 |
| 2014/0253883 A1* | 9/2014 | Akamatsu | G03B 21/142 353/85 |
| 2014/0300649 A1* | 10/2014 | Park | G09G 3/006 345/690 |
| 2014/0347587 A1* | 11/2014 | Xu | G02F 1/133707 349/43 |
| 2015/0063675 A1* | 3/2015 | Yan | G06T 7/001 382/141 |
| 2016/0086527 A1* | 3/2016 | Kim | G09G 3/006 324/750.01 |
| 2016/0261860 A1* | 9/2016 | Gu | G09G 3/006 |
| 2016/0371043 A1* | 12/2016 | Gupta | G06F 3/14 |
| 2017/0102302 A1* | 4/2017 | Gao | G01N 3/20 |

* cited by examiner

DISPLAY DEVICE, METHOD AND APPARATUS FOR ADJUSTING BRIGHTNESS OF THE DISPLAY DEVICE, AND METHOD AND APPARATUS FOR TESTING THE DISPLAY DEVICE

CROSS-REFERENCE TO RELATED APPLICATIONS

This application claims priority to Chinese Patent Application No. 201610172832.0, filed on Mar. 24, 2016, which is incorporated herein by reference in its entirety.

TECHNICAL FIELD

The disclosure relates to the field of display technology, and in particular, to a display device, a method and apparatus for adjusting brightness of the display device, and a method and apparatus for testing the display device.

BACKGROUND

A liquid crystal display (LCD) is a display product widely used in various electronic devices having a display device, such as a mobile phone. An LCD product applied in the mobile phone often encounters a mechanical collision such as a drop during use, and some damage may be caused on a light guide plate of the LCD since it is repeatedly collided and rubbed by components such as a battery in the mobile phone. Other electronic devices having the display device may also encounter a drop, a collision and so on during use. Regardless of the type of the display device, damage may occur after the display device is subjected to a certain degree of mechanical collision, affecting screen display of a user's display device, for example, making a bright spot occur on the screen, which can seriously affect the user experience.

SUMMARY

In view of the above, a display device, a method and apparatus for adjusting brightness of the display device, and a method and apparatus for testing the display device are provided according to the disclosure, which can prevent mechanical damages from affecting display brightness of the display device, such as a drop and a collision.

Based on the above objective, a method for adjusting brightness of a display device is provided according to the disclosure, which includes the following steps: detecting whether damage occurs on a light guide plate of the display device; determining a damage position and a damage extent of the light guide plate when the damage occurs on the light guide plate; and compensating for a change value of brightness generated due to the damage by adjusting the brightness of the display device corresponding to the damage position, according to a predetermined correspondence between damage extents and change values of brightness.

Optionally, the step of determining the damage extent of the light guide plate specifically includes: determining the damage extent of the light guide plate according to a pressure subjected when the damage occurs; and/or, determining the damage extent of the light guide plate according to a deformation detected by a deformation sensor arranged inside the display device.

Moreover, an apparatus for adjusting brightness of a display device is further provided according to the disclosure, which includes: a damage detecting module, configured for detecting whether damage occurs on a light guide plate of the display device; a damage determining module, configured for determining a damage position and a damage extent of the light guide plate when the damage occurs on the light guide plate; and a brightness compensating module, configured for compensating for a change value of brightness generated due to the damage by adjusting the brightness of the display device corresponding to the damage position, according to a predetermined correspondence between damage extents and change values of brightness.

Optionally, the damage determining module specifically includes: a pressure determining unit, configured for determining the damage extent of the light guide plate according to a pressure subjected when the damage occurs; and/or, a deformation determining unit, configured for determining the damage extent of the light guide plate according to a deformation detected by a deformation sensor arranged inside the display device.

Moreover, a display device is further provided according to the disclosure, which includes the apparatus for adjusting brightness of the display device according to any one of embodiments of the disclosure.

Optionally, the display device includes a deformation determining unit configured for determining the damage extent of the light guide plate according to a deformation detected by a deformation sensor arranged inside the display device, the deformation sensor is a pressure capacitor, and the pressure capacitor includes a signal sending electrode and a signal receiving electrode, which are respectively arranged at a side of a light emitting face of the light guide plate of the display device and a side opposite to the light emitting face of the light guide plate.

Optionally, one of the signal receiving electrode and the signal sending electrode is arranged on a display panel of the display device, and the other of the signal receiving electrode and the signal sending electrode is arranged on a reflective sheet under the light guide plate.

Optionally, the signal receiving electrode is arranged on the display panel and is a common electrode of the display panel.

Optionally, the display device further includes a cell defined by a first substrate and a second substrate, a light guide plate, a reflective sheet arranged on the light guide plate, a signal receiving electrode arranged on the first substrate, and a signal sending electrode arranged on the reflective sheet. The light guide plate is arranged on the first substrate. The light guide plate and the second substrate are located on two sides of the first substrate. The signal receiving electrode and the signal sending electrode define a pressure touching capacitor.

Optionally, the signal receiving electrode further serves as a common electrode on the first substrate.

Optionally, the signal receiving electrode includes multiple electrode blocks, and the multiple electrode blocks are arranged in a matrix on the first substrate.

Optionally, the damage detecting module in the apparatus for adjusting brightness of the display device is configured for determining whether the damage occurs on the light guide plate according to a deformation of the light guide plate detected by the pressure touching capacitor; and the damage determining module in the apparatus for adjusting brightness of the display device is configured for determining the damage position and the damage extent of the light guide plate according to a change of capacitance between the multiple electrode blocks of the signal receiving electrode and the signal sending electrode when the damage occurs on the light guide plate.

Furthermore, a method for testing a display device is further provided according to the disclosure, which includes: applying a destructive operation to the display device to be tested; detecting a damage extent generated by the destructive operation and a change value of brightness correspondingly generated in a damage region; and creating and storing a correspondence between the damage extent and the change value of brightness.

Optionally, the step of detecting a damage extent generated by the destructive operation specifically includes: determining the damage extent based on a change of capacitance detected by a pressure capacitor arranged inside the display device to be tested; or, detecting a pressure value applied to the display device to be tested by a pressure sensor arranged on the display device to be tested and recording the pressure value as the corresponding damage extent.

Furthermore, an apparatus for testing a display device is further provided according to the disclosure, which includes: a destruction applying module, configured for applying a destructive operation to the display device to be tested; a damage extent detecting module, configured for detecting a damage extent generated by the destructive operation; a brightness detecting module, configured for detecting a change value of brightness correspondingly generated in a damage region; and a test result storing module, configured for creating and storing a correspondence between the damage extent and the change value of brightness.

Optionally, the brightness detecting module is a light detecting mechanism.

Optionally, the damage extent detecting module specifically includes: a capacitance detecting unit, configured for calculating the damage extent based on a change of capacitance detected by a pressure touching capacitor arranged inside the display device to be tested; or, a pressure detecting unit, configured for calculating the damage extent according to a pressure value applied to the display device to be tested which is detected by a pressure sensor arranged on the display device to be tested.

Optionally, the destruction applying module includes a stage, a first mechanical arm, a second mechanical arm and a destruction applying structure. The stage is used for fixing the display device to be tested during testing. One end of the first mechanical arm is connected to the destruction applying structure, and the other end of the first mechanical arm is connected to a first slide rail under the stage and is capable of sliding in the first slide rail. One end of the second mechanical arm is connected to the light detecting mechanism, and the other end of the second mechanical arm is connected to a second slide rail above the stage and is capable of sliding in the second slide rail. The destruction applying structure is telescopically connected to the first mechanical arm and is used for applying a destructive force to the display device to be tested according to a predetermined parameter; and a sliding range of the first mechanical arm in the first slide rail includes a region for fixing the display device, and a sliding range of the second mechanical arm in the second slide rail includes the region for fixing the display device.

Optionally, the test result storing module is a register of a display chip.

As can be seen from the above, with the method for adjusting brightness of the display device, the method for testing the display device, and the apparatus for testing the display device according to the disclosure, the display brightness of the display device may be adjusted according to the pre-stored correspondence between damage extents and change values of brightness in the case that the display device encounters a mechanical damage due to a drop, an impact and the like, thereby enabling the display device to display normally and preventing the display effect from being affected by the damage of the display device caused due to a collision and the like.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To make the technical issues, technical solutions and advantages of the present disclosure clearer, embodiments of the present disclosure are described in detail with reference to drawings hereinafter.

Figure 1:
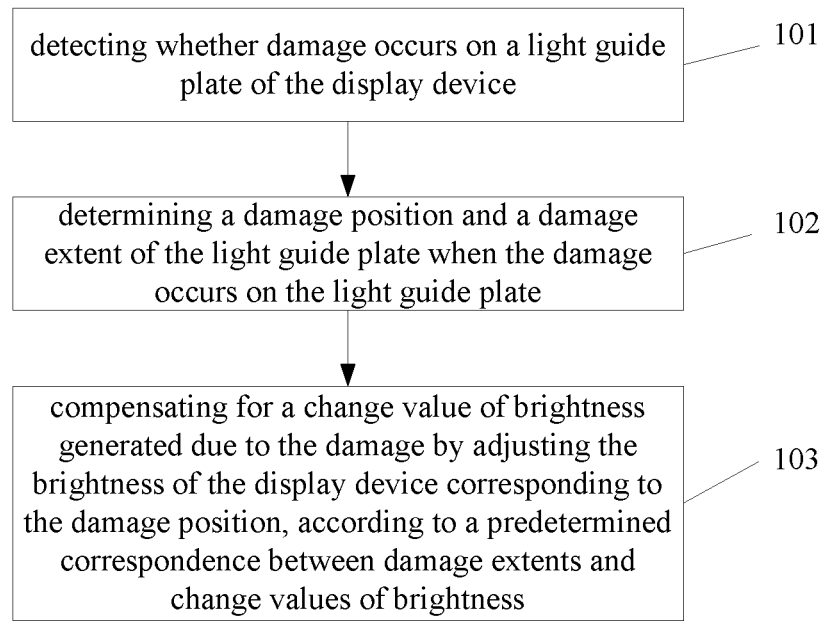
FIG. 1 is a schematic flowchart of a method for adjusting brightness of a display device according to one embodiment of the disclosure.

A method for adjusting brightness of a display device is first provided according to the disclosure, which includes the steps as shown in FIG. 1.

Step 101 is to detect whether damage occurs on a light guide plate of the display device.

Step 102 is to determine a damage position and a damage extent of the light guide plate when the damage occurs on the light guide plate.

Step 103 is to compensate for a change value of brightness generated due to the damage by adjusting the brightness of the display device corresponding to the damage position, according to a predetermined correspondence between damage extents and change values of brightness.

An electronic product with a display device, such as a mobile phone, a computer, a portable mobile product, is subjected to a collision due to various reasons during use, causing a backlight module inside the display device to encounter an impact and a friction, and this external mechanical force may cause a light guide plate or light guide plate assemblies to be deformed. Therefore, the display brightness is permanently changed, resulting in a case that non-uniform brightness occurs for the display device originally having uniform brightness in a display region. With the method for adjusting brightness of the display device according to the disclosure, it can be detected that the damage occurs on the light guide plate of the display device, and the display brightness of the display device is adjusted according to the damage position and the damage extent, and the change value of the brightness generated due to the damage is compensated. If the damage results in increasing brightness in the damage region of the display device, the display brightness of the corresponding region is decreased. If the damage results in decreasing brightness of in the damage region of the display device, the display brightness of the corresponding region is increased. As a result, it is able to prevent the change of the display brightness caused by the mechanical damage and to ensure the display quality of the display device when the damage occurs.

In the embodiment of the disclosure, the step of detecting whether the damage occurs on the light guide plate of the display device primarily includes detecting whether the damage occurs on the light guide plate and a film arranged on the light guide plate.

In the embodiment, the display device according to the disclosure is a liquid crystal display. In an early period of production and manufacture of the liquid crystal display, first different degrees of damage and area occurring on the display device under different pressures are tested and recorded, a pressure sensor is added on the display product to detect and locate a pressure from a machine enclosure behind the backlight module. When the pressure reaches a certain degree, the light guide plate of the backlight module is damaged and the change of brightness is generated, and the correspondence between the change value of brightness and the damage extent is recorded. When a certain region of the backlight module is damaged in the actual use of the display device, grayscale data of an image in such region is immediately modified to compensate for the change value of brightness, so that a value of the display brightness is substantially identical to a brightness value under a normal condition, ensuring display uniformity of the display screen to be remained perfectly.

In one embodiment of the disclosure, since the damage is substantially generated by a certain impact force, a correspondence substantially exists between the impact force and the damage extent in a case that materials and shapes of the light guide plate and the film arranged on the light guide plate are unchanged. For example, for a display device of a certain type, a vertical impact force of 1000N generally may cause the light guide plate to be deformed by 0.5%. Therefore, a deformation can be determined by detecting the impact force.

In one embodiment of the disclosure, the damage extent may also be determined by directly measuring deformations of the light guide plate or the film arranged on the light guide plate. Through experiments, a bright spot occurs on the light guide plate when the display product is subjected to a pressure, and a position where the bright spot occurs generally is coincident with a region of a flexible circuit board under the light guide plate or a raised region on the machine enclosure.

In one embodiment of the disclosure, the light guide plate includes the light guide plate itself and the film arranged on the light guide plate.

In the embodiment of the disclosure, since a final objective of detecting the damage is to prevent the display brightness from being affected by the damage, the damage extent of the light guide plate may also be determined by measuring display brightness in respective regions of the display device.

In some embodiments of the disclosure, the step of determining a damage extent of the light guide plate specifically includes: determining the damage extent of the light guide plate according to a pressure subjected when the damage occurs; and/or, determining the damage extent of the light guide plate according to a deformation detected by a deformation sensor arranged inside the display device.

Specifically, the pressure may be detected by a pressure sensor.

Figure 2:
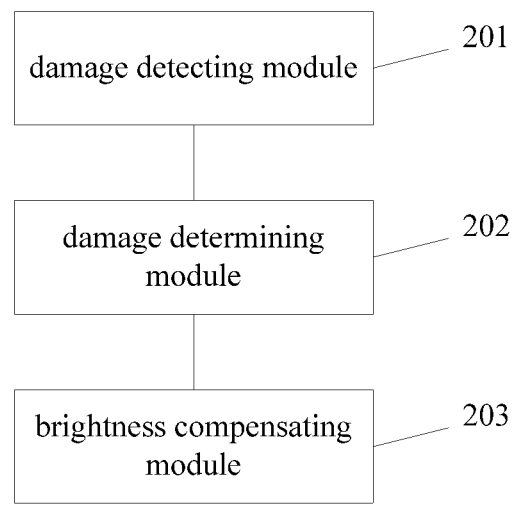
FIG. 2 is a schematic structural diagram of an apparatus for adjusting brightness of a display device according to one embodiment of the disclosure.

Moreover, an apparatus for adjusting brightness of a display device is provided according to the disclosure, which has a structure as shown in FIG. 2, and includes: a damage detecting module 201, a damage determining module 202, and a brightness compensating module 203.

The damage detecting module 201 is configured to detect whether damage occurs on a light guide plate of the display device.

The damage determining module 202 is configured to determine a damage position and a damage extent of the light guide plate when the damage occurs on the light guide plate.

The brightness compensating module 203 is configured to compensate for a change value of brightness generated due to the damage by adjusting the brightness of the display device corresponding to the damage position, according to a predetermined correspondence between damage extents and change values of brightness.

In some embodiments of the disclosure, the damage determining module specifically includes a pressure determining unit and/or a deformation determining unit.

The pressure determining unit is configured to determine the damage extent of the light guide plate according to a pressure subjected when the damage occurs.

The deformation determining unit is configured to determine the damage extent of the light guide plate according to a deformation detected by a deformation sensor arranged inside the display device.

Furthermore, a display device is further provided according to the disclosure, including the apparatus for adjusting brightness of the display device according to any one of embodiments of the disclosure.

In some embodiments of the disclosure, the damage determining module specifically includes a deformation determining unit configured for determining the damage extent of the light guide plate according to a deformation detected by the deformation sensor arranged inside the display device. The deformation sensor may be a touch capacitor or a pressure capacitor. The pressure capacitor includes a signal sending electrode and a signal receiving electrode. The signal sending electrode and the signal receiving electrode are respectively arranged at a side of a light emitting face of the light guide plate of the display device and a side opposite to the light emitting face of the light guide plate.

Figure 7:
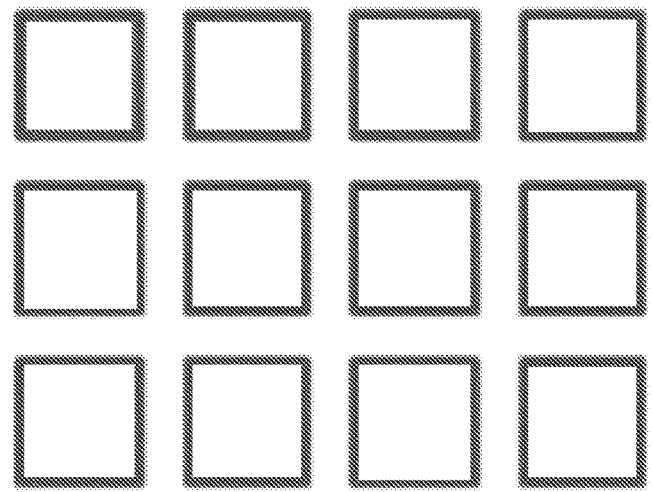
FIG. 7 is a schematic structural diagram of a signal sending electrode or a signal receiving electrode according to one embodiment of the disclosure.

In some embodiments of the disclosure, one of the signal receiving electrode and the signal sending electrode is arranged on a display panel of the display device, and the other of the signal receiving electrode and the signal sending electrode is arranged on a reflective sheet under the light guide plate. In the embodiment of the disclosure, the signal receiving electrode and the signal sending electrode may have a structure shown in FIG. 7.

In some embodiments of the disclosure, the signal receiving electrode is arranged on the display panel and is a common electrode of the display panel. The signal receiving electrode doubles as the common electrode of the display panel so that the thickness of the display panel is not substantially increased due to the presence of the deformation sensor.

Figure 8:
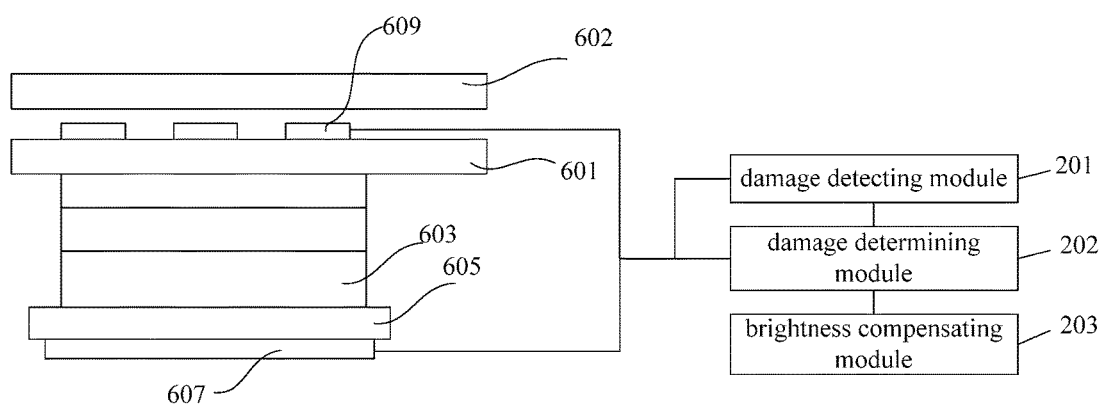
FIG. 8 is a schematic structural diagram of a display device according to one embodiment of the disclosure.

In one embodiment of the disclosure, as shown in FIG. 8, the display device includes a cell defined by a first substrate 601 and a second substrate 602, a light guide plate 603, a reflective sheet 605, a signal receiving electrode 609 arranged on the first substrate 601, a signal sending electrode 607 arranged on the reflective sheet 605, and the above apparatus for adjusting brightness of the display device. The signal receiving electrode 609 may double as the common electrode on the first substrate 601 so that the thickness of the display device is not substantially increased due to the presence of the deformation sensor.

Figure 3:
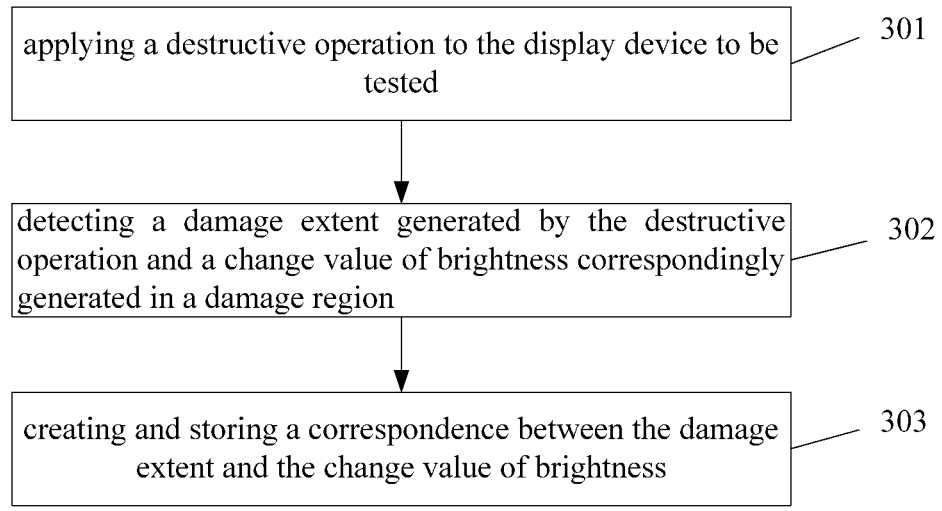
FIG. 3 is a schematic flowchart of a method for testing a display device according to one embodiment of the disclosure.

Moreover, a method for testing a display device is provided according to the disclosure, including steps as shown in FIG. 3.

Step 301 is to apply a destructive operation to the display device to be tested.

Step 302 is to detect a damage extent generated by the destructive operation and a change value of brightness correspondingly generated in a damage region.

Step 303 is to create and store a correspondence between the damage extent and the change value of brightness.

As can be seen from the above, with the method for testing the display device according to the disclosure, the correspondence between the damage extent and the change value of brightness is obtained by applying the destructive operation to the display device to be tested in a test phase of the display product, thereby enabling the display device to adjust the brightness when the damage occurs according to the correspondence between the damage extent and the change value of brightness obtained through the test, effectively compensating for the change value of brightness caused by the damage, and preventing the display brightness of the display device from adverse effects due to a mechanical damage such as a collision and a drop.

In the embodiment of the disclosure, if the change value of brightness is not only related to the damage extent, but also to a region where the damage occurs, the region where the damage occurs, the damage extent, and the change value of brightness are needed to be stored and correspondences among them are set when the step 303 is performed. The region where the damage occurs may be recorded with coordinates.

In some embodiments of the disclosure, the step of detecting a damage generated by the destructive operation specifically includes: determining the damage extent based on a change of capacitance detected by a pressure capacitor which is arranged inside the display device to be tested; or, detecting a pressure value applied to the display device to be tested by a pressure sensor arranged on the display device to be tested and recording the pressure value as the corresponding damage extent.

In the embodiment of the disclosure, if different damages occur in different regions of the light guide plate when being subjected to the same mechanical collision, relationships among a light emitting region of the light guide plate, a pressure value subjected in the region and a change value of brightness are needed to be created.

Figure 4:
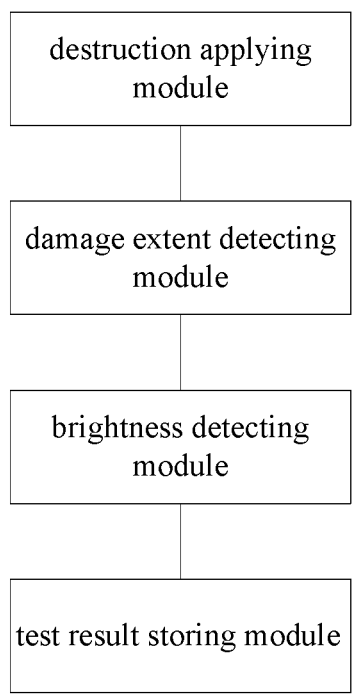
FIG. 4 is a schematic structural diagram of an apparatus for testing a display device according to one embodiment of the disclosure.

Furthermore, an apparatus for testing a display device is provided according to the disclosure, which has a structure as shown in FIG. 4, and includes: a destruction applying module 401, a damage extent detecting module 402, a brightness detecting module 403 and a test result storing module 404.

The destruction applying module 401 is configured to apply a destructive operation to the display device to be tested.

The damage extent detecting module 402 is configured to detect a damage extent generated by the destructive operation.

The brightness detecting module 403 is configured to detect a change value of brightness correspondingly generated in a damage region.

The test result storing module 404 is configured to create and store a correspondence between the damage extent and the change value of the brightness.

The brightness detecting module 403 may use a light detecting mechanism. The test result storing module 404 may be a register of a display chip.

In some embodiments of the disclosure, the damage extent detecting module specifically includes a capacitance detecting unit, or, a pressure detecting unit.

The capacitance detecting unit is configured to calculate the damage extent based on a change of capacitance detected by a pressure touching capacitor arranged inside the display device to be tested.

The pressure detecting unit is configured to calculate the damage extent according to a pressure value applied to the display device to be tested which is detected by a pressure sensor arranged on the display device to be tested.

Figure 5:
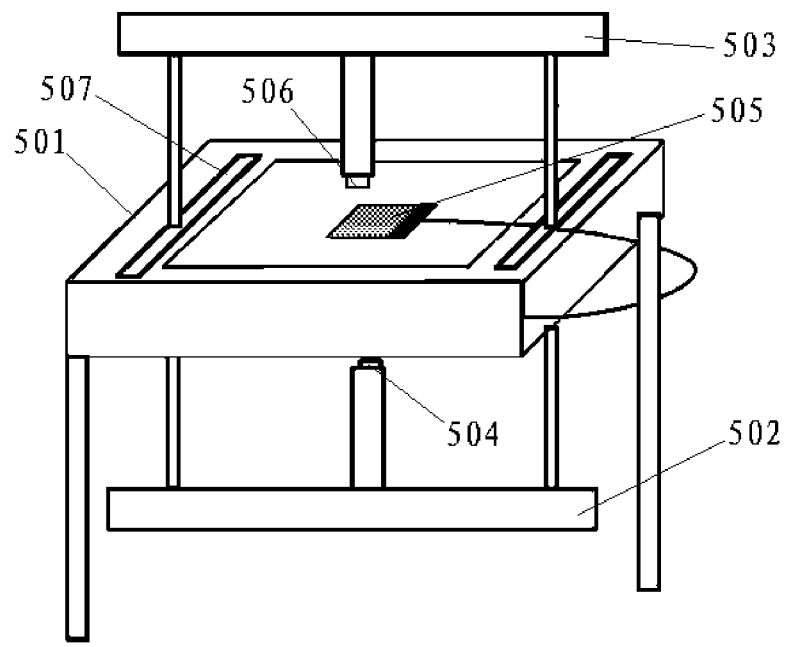
FIG. 5 is a schematic diagram of a specific structure of a destruction applying module according to one embodiment of the disclosure.

In some embodiments of the disclosure, the destruction applying module has a structure as shown in FIG. 5, and includes a stage 501, a first mechanical arm 502, a second mechanical arm 503 and a destruction applying structure 504.

The stage 501 is to fix a display device 505 to be tested during testing.

One end of the first mechanical arm 502 is connected to the destruction applying structure 504, and the other end of the first mechanical arm is connected to a first slide rail under the stage and is capable of sliding in the first slide rail.

One end of the second mechanical arm 503 is connected to the light detecting mechanism 506, and the other end of the second mechanical arm is connected to a second slide rail 507 above the stage and is capable of sliding in the second slide rail 507.

The destruction applying structure 504 is telescopically connected to the first mechanical arm 502 and is to apply a destructive force to the display device to be tested according to a predetermined parameter.

A sliding range of the first mechanical arm 502 in the first slide rail includes a region for fixing the display device, and a sliding range of the second mechanical arm 503 in the second slide rail 507 includes the region for fixing the display device.

In one embodiment of the disclosure, the display device to be tested may be an entire display device, or may also be a part to be tested on the display device, for example, may only be a backlight module.

In the actual use of the destruction applying structure as shown in FIG. 5, first the backlight module and the enclosure are assembled, and then are placed on the stage and are tested. The destruction applying structure is moved to a position corresponding to the display device to be tested using the first mechanical arm, and the display device to be tested is pressed by the destruction applying structure with different pressures to simulate an actual stress condition of the display device to be tested.

Figure 6:
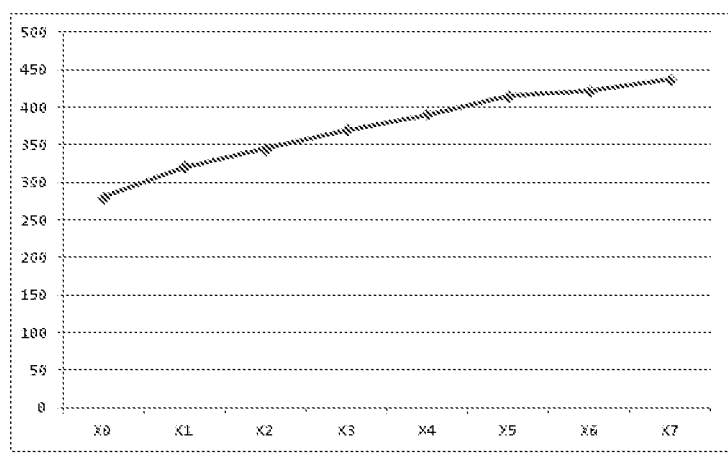
FIG. 6 is a line graph of a relationship between a destruction extent and brightness according to one embodiment of the disclosure.

In one embodiment of the disclosure, the correspondence between a test pressure and brightness is shown in FIG. 6. When an applied pressure is X0, that is, no pressure is applied, a corresponding brightness of the screen is 280 nit. After the pressure begins to be applied, when the pressure is X1, a corresponding brightness of the screen becomes 320 nit. A correspondence graph between the pressure and the brightness of the screen is obtained by continuously increasing the pressure through the destruction applying structure and measuring brightness values under different pressure values. Finally data obtained through experimental tests is stored into the register of the display chip. Then other components of the display device are assembled to complete the manufacture of the display product.

When a mobile phone encounters forces caused by a drop, a shock, and the like during use, first the pressure sensor or the deformation sensor is used to determine a stressed position and area. Since the common electrode inherent in a process for an array substrate may be manufactured as a separate sensor with a high resolution, thus, the stressed position and area can be accurately identified. Then, the pre-stored data is called, and the change value of brightness under the corresponding pressure is found. Taking FIG. 6 as an example, a pressure is X3, a corresponding change value of brightness is obtained by subtracting the corresponding brightness 280 nit under X0 from the corresponding brightness 370 nit under X3. In this case, a brightness of a bright spot region is higher than 90/280 nit=32% of the brightness without a bright spot. Then, a gray scale of the bright spot region is adjusted to decrease the brightness to original brightness, thereby keeping the brightness of the bright spot region being consistent with the brightness of surrounding regions without pressure, and greatly improving a bright spot phenomenon.

In one embodiment of the disclosure, the light detecting mechanism includes optical lens for receiving light of the display device to be tested.

As can be seen from the above, with the method for adjusting brightness of the display device, the method and the apparatus for testing the display device, and the display device according to the disclosure, the display brightness of the display device can be adjusted according to the pre-stored relationship between the damage extent and the change value of brightness in the case that the display device encounters a mechanical damage due to a drop, an impact and the like, thereby enabling the display device to display normally and preventing the display effect from being affected by the damage of the display device due to a collision and the like.

It should be understood that the multiple embodiments described in the present specification are only used to illustrate and explain the present disclosure, but not to limit it. In the case of no conflict, the embodiments and the features of the embodiments in the present application may be combined with each other.

Obviously, various modifications and variations may be made to the present disclosure by those skilled in the art without departing from the spirit and the scope of the present disclosure. Thus, if the modifications and variations of the present disclosure fall within the scope of the claims and their equivalents of the present disclosure, such modifications and variations are also intended to be included in the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for adjusting brightness of a display device including a light guide plate with damage, comprising the following steps:
   determining a damage position and a damage extent of the light guide plate when the damage occurs on the light guide plate;
   compensating for a change value of brightness generated due to the damage by adjusting brightness of the display device corresponding to the damage position, according to a predetermined correspondence between damage extents and change values of brightness;
   wherein the step of determining the damage extent of the light guide plate comprises determining the damage extent of the light guide plate according to a deformation of the light guide plate detected by a deformation sensor inside the display device; and
   wherein the deformation sensor is a pressure touching capacitor; the pressure touching capacitor comprises a signal sending electrode and a signal receiving electrode; the signal sending electrode and the signal receiving electrode are arranged at a side of a light emitting face of the light guide plate and a side opposite to the light emitting face of the light guide plate, respectively.

2. The method according to claim 1, wherein the step of determining the damage extent of the light guide plate further comprises:
   determining the damage extent of the light guide plate according to a pressure subjected when the damage occurs.

3. An apparatus for adjusting brightness of a display device including a light guide plate with damage, comprising:
   a damage determining module, configured to determine a damage position and a damage extent of the light guide plate when the damage occurs on the light guide plate, wherein the damage determining module comprises a deformation determining unit, configured to determine the damage extent of the light guide plate according to a deformation of the light guide plate detected by a deformation sensor inside the display device; and
   wherein the display device is configured to compensate for a change value of brightness generated due to the damage by adjusting brightness of the display device corresponding to the damage position, according to a predetermined correspondence between damage extents and change values of brightness; and
   wherein the deformation sensor is a pressure touching capacitor; the pressure touching capacitor comprises a signal sending electrode and a signal receiving electrode; the signal sending electrode and the signal receiving electrode are arranged at a side of a light emitting face of the light guide plate and a side opposite to the light emitting face of the light guide plate, respectively.

4. The apparatus according to claim 3, wherein the damage determining module further comprises:

a pressure determining unit, configured to determine the damage extent of the light guide plate according to a pressure subjected when the damage occurs.

5. The display device according to claim 3, wherein one of the signal receiving electrode and the signal sending electrode is on a display panel of the display device; the other of the signal receiving electrode and the signal sending electrode is on a reflective sheet under the light guide plate.

6. The display device according to claim 5, wherein the signal receiving electrode is on the display panel and is a common electrode of the display panel.

7. The display device according to claim 3, wherein the display device further comprises a cell defined by a first substrate and a second substrate, a reflective sheet on the light guide plate, wherein the signal receiving electrode is disposed on the first substrate, and the signal sending electrode is disposed on the reflective sheet;
wherein the light guide plate is on the first substrate; the light guide plate and the second substrate are at two sides of the first substrate, respectively.

8. The display device according to claim 7, wherein the signal receiving electrode further serves a common electrode on the first substrate.

9. The display device according to claim 8, wherein the signal receiving electrode comprises a plurality of electrode blocks; the plurality of electrode blocks are arranged in a matrix on the first substrate.

10. The display device according to claim 9, wherein
the damage determining module in the apparatus for adjusting brightness of the display device is configured to determine the damage position and the damage extent of the light guide plate according to a change of capacitance between the signal sending electrode and the plurality of electrode blocks of the signal receiving electrode when the damage occurs on the light guide plate.

11. A method for testing the display device according to claim 3, comprising:
applying a destructive operation to the display device to be tested;
detecting a damage extent generated by the destructive operation and a change value of brightness correspondingly generated in a damage region; and
creating and storing a correspondence between the damage extent and the change value of brightness.

12. The method according to claim 11, wherein the step of detecting the damage extent generated by the destructive operation further comprises:
detecting a pressure value applied to the display device to be tested by a pressure sensor on the display device to be tested and recording the pressure value as the corresponding damage extent.

13. An apparatus for testing a display device, comprising:
a destruction applying module, configured to apply a destructive operation to the display device to be tested;
a damage extent detecting module, configured to detect a damage extent generated by the destructive operation;
a brightness detecting module, configured to detect a change value of brightness correspondingly generated in a damage region; and a test result storing module, configured to create and store a correspondence between the damage extent and the change value of brightness;
wherein the damage extent detecting module comprises a deformation determining unit, configured to determine the damage extent of a light guide plate according to a deformation of the light guide plate detected by a deformation sensor inside the display device; and
wherein the deformation sensor is a pressure touching capacitor; the pressure touching capacitor comprises a signal sending electrode and a signal receiving electrode; the signal sending electrode and the signal receiving electrode are arranged at a side of a light emitting face of the light guide plate and a side opposite to the light emitting face of the light guide plate, respectively.

14. The apparatus according to claim 13, wherein the damage extent detecting module further comprises:
a pressure detecting unit, configured to calculate the damage extent according to a pressure value applied to the display device to be tested which is detected by a pressure sensor on the display device to be tested.

15. The apparatus according to claim 13, wherein the destruction applying module comprises:
a stage;
a first mechanical arm;
a second mechanical arm; and
a destruction applying structure;
wherein the stage is configured to fix the display device to be tested during testing;
wherein one end of the first mechanical arm is connected to the destruction applying structure, and the other end of the first mechanical arm is connected to a first slide rail under the stage and is capable of sliding in the first slide rail;
wherein one end of the second mechanical arm is connected to the light detecting mechanism, and the other end of the second mechanical arm is connected to a second slide rail above the stage and is capable of sliding in the second slide rail;
wherein the destruction applying structure is telescopically connected to the first mechanical arm and is configured to apply a destructive force to the display device to be tested according to a predetermined parameter; and
wherein a sliding range of the first mechanical arm in the first slide rail comprises a region for fixing the display device, and a sliding range of the second mechanical arm in the second slide rail comprises the region for fixing the display device.

16. The apparatus according to claim 15, wherein the first mechanical arm is below the stage, and the second mechanical arm is above the stage; the second mechanical arm includes a horizontal bar and a vertical bar; the vertical bar has an upper end and a lower end pointing the stage; the upper end is mounted to the horizontal bar; and the light detecting mechanism is mounted to the lower end.

* * * * *